(12) United States Patent
Kuschk et al.

(10) Patent No.: US 12,546,860 B2
(45) Date of Patent: Feb. 10, 2026

(54) MAGNITUDE CALIBRATION OF RADAR SENSOR BASED ON RADAR MAP OF KNOWN OBJECTS

(71) Applicant: GM Cruise Holdings LLC, San Francisco, CA (US)

(72) Inventors: Georg Kuschk, Garmisch-Partenkirchen (DE); Marc Unzueta Canals, Munich (DE); Michael Meyer, Munich (DE); Sven Möller, Lübbecke (DE)

(73) Assignee: GM Cruise Holdings LLC, San Francisco, CA (US)

( * ) Notice: Subject to any disclaimer, the term of this patent is extended or adjusted under 35 U.S.C. 154(b) by 546 days.

(21) Appl. No.: 17/899,724

(22) Filed: Aug. 31, 2022

(65) Prior Publication Data
US 2024/0036162 A1 Feb. 1, 2024

(30) Foreign Application Priority Data
Jul. 29, 2022 (EP) .................... 22187754

(51) Int. Cl.
*G01S 7/40* (2006.01)
*G01S 7/41* (2006.01)
*G01S 13/931* (2020.01)

(52) U.S. Cl.
CPC ............. *G01S 7/4091* (2021.05); *G01S 7/40* (2013.01); *G01S 7/411* (2013.01); *G01S 7/412* (2013.01); *G01S 13/931* (2013.01)

(58) Field of Classification Search
CPC ................ G01S 7/40–4095; G01S 13/931
See application file for complete search history.

(56) References Cited

U.S. PATENT DOCUMENTS

| | | | |
|---|---|---|---|
| 9,719,801 B1 * | 8/2017 | Ferguson | G01C 21/3602 |
| 10,712,742 B2 * | 7/2020 | Valois | G01S 13/931 |
| 10,823,821 B2 * | 11/2020 | Fechner | G01S 17/931 |
| 10,832,502 B2 * | 11/2020 | Levinson | G05D 1/0038 |

(Continued)

FOREIGN PATENT DOCUMENTS

| | | | | |
|---|---|---|---|---|
| DE | 102016221440 A1 * | 5/2018 | | |
| EP | 3825727 A1 * | 5/2021 | ........... | G01S 13/931 |
| WO | 2021138204 A1 | 7/2021 | | |

OTHER PUBLICATIONS

DE20240036162A1 translation. (Year: 2018).*

(Continued)

*Primary Examiner* — Matthew M Barker
(74) *Attorney, Agent, or Firm* — Honigman LLP; Matthew H. Szalach; Jonathan P. O'Brien

(57) ABSTRACT

A method of calibrating a radar sensor includes receiving radar returns from a plurality of objects based on a radar signal sent from the radar sensor, each of the radar returns having a magnitude, at least a subset of the objects are known static objects, identifying a location and orientation of the radar sensor when the signal was sent, identifying expected reflectance values for each of the plurality of known static objects, calculating a conversion function configured to adjust the magnitudes of each of the radar returns for the known static objects to an estimated reflectance value based on the expected reflectance values for each of the known static objects, and adjusting an output of the radar sensor based on the conversion function.

20 Claims, 5 Drawing Sheets

(56) References Cited

U.S. PATENT DOCUMENTS

| | | | | |
|---|---|---|---|---|
| 11,145,146 | B2* | 10/2021 | Mercep | B60W 50/0225 |
| 11,435,440 | B2* | 9/2022 | Slobodyanyuk | ............................ |
| | | | | G08G 1/096758 |
| 11,443,524 | B2* | 9/2022 | Aguiar | G01S 17/86 |
| 11,714,190 | B1* | 8/2023 | Duncklee | G01S 7/4004 |
| | | | | 342/70 |
| 12,134,410 | B2* | 11/2024 | Gottbehüt | B60W 60/0053 |
| 2009/0228204 | A1* | 9/2009 | Zavoli | G01C 21/30 |
| | | | | 701/532 |
| 2017/0124781 | A1* | 5/2017 | Douillard | G08G 1/207 |
| 2019/0162820 | A1 | 5/2019 | Agarwal et al. | |
| 2020/0018618 | A1* | 1/2020 | Ozog | G01S 7/52004 |
| 2022/0113376 | A1* | 4/2022 | Zechner | G01S 7/403 |

OTHER PUBLICATIONS

"Extended European Search Report for European Patent Application No. 22187754.1", Mailed Date: Dec. 20, 2022, 10 pages.
"Response to the Extended European Search Report for European Patent Application No. 22187754.1", Filed Date: Jan. 12, 2024, 15 pages.

* cited by examiner

MAGNITUDE CALIBRATION OF RADAR SENSOR BASED ON RADAR MAP OF KNOWN OBJECTS

RELATED APPLICATION

This application claims priority to European Patent Application No. 22187754.1, filed on Jul. 29, 2022, and entitled "MAGNITUDE CALIBRATION OF RADAR SENSOR BASED ON RADAR MAP OF KNOWN OBJECTS". The entirety of this application is incorporated herein by reference.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others. The autonomous vehicle operates (i.e., steering, braking, propulsion, etc.) based upon sensor signals from the sensor systems.

Some vehicles use multiple sensors of the same given type, such as multiple radar sensors, so that the vehicle has a larger field of view than a single such sensor would ordinarily provide. Since the autonomous vehicle depends on the sensor systems to provide information of the surrounding environment to operate safely without a human driver, it is imperative that the sensor systems provide accurate information. For a variety of reasons, such as, but not limited to, differences between sensors, obstructed views of the environment around the vehicle, manufacturing defects or other discrepancies in sensors, in vehicles, and/or in mounting hardware, and prolonged exposure to the environment, sensor measurements may not be an accurate representative of an environment nearby the vehicle.

To ensure accuracy and safety, sensor systems, such as radar sensor systems, should be calibrated often.

SUMMARY

The following is a brief summary of subject matter that is described in greater detail herein. This summary is not intended to be limiting as to the scope of the claims.

Described herein are various technologies relating to the calibration of radar sensors. An exemplary implementation of a method of calibrating a radar sensor includes transmitting a radar signal into an operating environment and receiving radar returns from a plurality of objects in the operating environment based on the radar signal sent. Each of the radar returns has a magnitude associated with each of the plurality of objects. At least a subset of the objects are known static objects (e.g., stop signs, bridges, buildings, etc.). The method further includes identifying a location and orientation of the radar sensor when the signal was sent and identifying expected reflectance values for each of the plurality of known static objects. Based on the location and orientation of the radar sensor and the expected reflectance values, a conversion function is calculated to adjust the magnitudes associated with each of the radar returns from the known static objects to an estimated reflectance value. The output of the radar sensor is then adjusted based on the conversion function. In an exemplary implementation, identifying expected reflectance values for each of the plurality of known static objects includes accessing a predetermined radar map of the operating environment of the radar sensor containing the plurality of known static objects. The predetermined radar map identifies expected reflectance values for each of the known static objects.

In an exemplary implementation, a radar sensor coupled to an autonomous vehicle is located in an operating environment. The radar sensor can include a signal processing component configured to capture a plurality of radar returns from the one or more objects in the environment. At least a subset of the objects are known static objects. The system further includes a radar map module configured to access a predetermined radar map of the radar data for the known static objects in the operating environment, a radar sensor position module configured to identify a location and orientation of the radar sensor when the signal was sent, and a comparison module configured to identify expected reflectance values for each of the known static objects based on the identified location and orientation of the radar sensor. The system also includes a correction module configured to calculate a conversion function to adjust the magnitudes of each of the radar returns from the known static objects to an estimated reflectance value based on the expected reflectance values for each of the known static objects and to adjust an output of the radar sensor based on the conversion function.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to the calibration of a radar sensor are described herein. With more particularity, technologies described herein relate to calibrating a radar sensor using a radar map of known static objects in an operational environment of the radar sensor. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Figure 1:
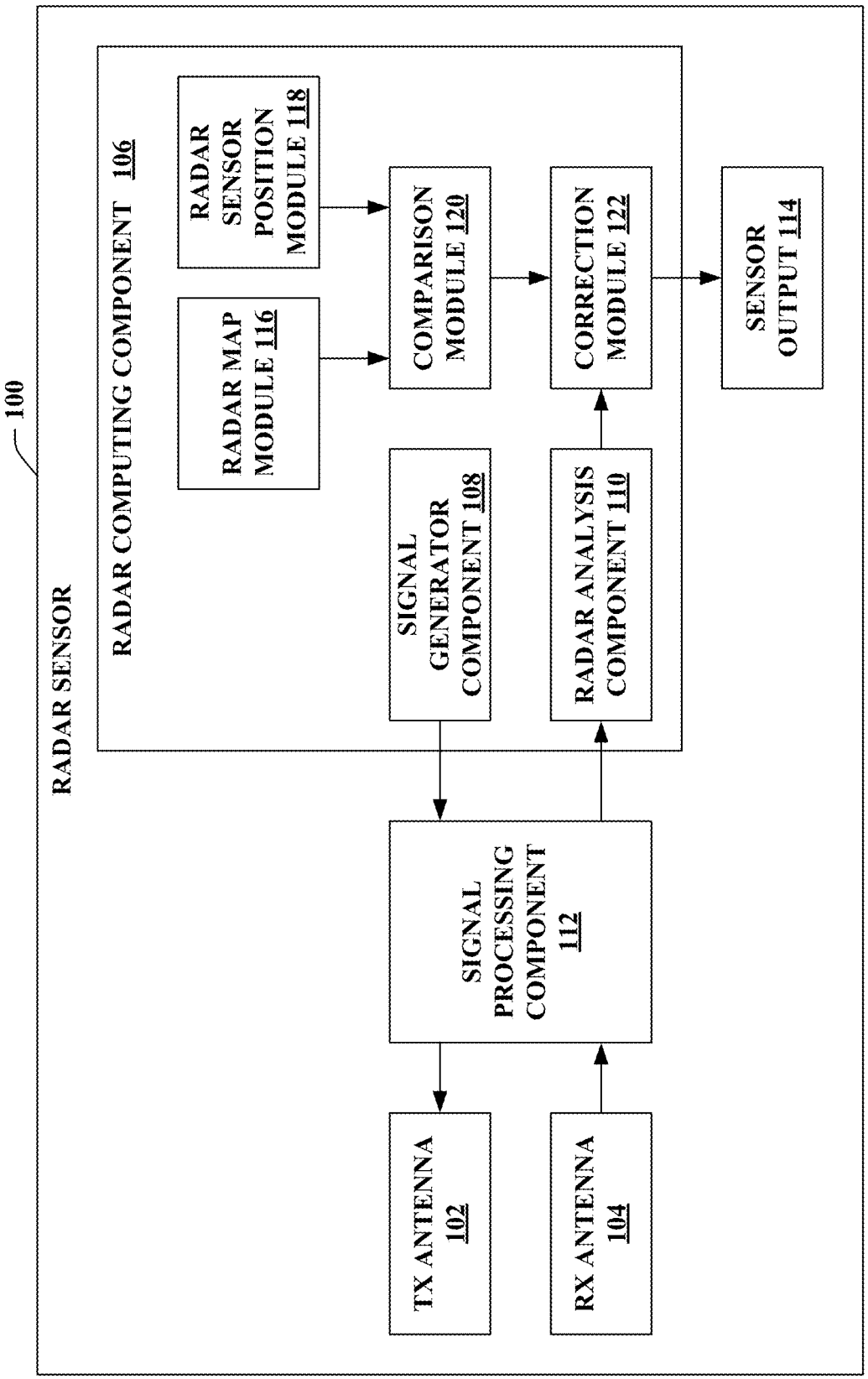
FIG. 1 is a functional block diagram of an exemplary radar sensor.

FIG. 1 is a high-level illustration of an exemplary radar sensor 100. The radar sensor 100 may be any suitable radar sensor 100. In the illustrated implementation, the radar sensor 100 includes a transmit antenna 102, a receive antenna 104, and a radar computing component 106. Briefly, the radar computing component 106 is configured to prepare radar signals that are transmitted by the transmit antenna 102, and to compute object solutions indicating estimated positions and/or velocities of objects based upon radar returns received by the receive antenna 104. In exemplary implementations, various components of the radar sensor 100 can be integrated as a same system-on-a-chip (SoC). In various implementations, the radar sensor 100 can be employed on a vehicle, such as a land vehicle, an aircraft, to identify positions and velocities of objects in the operational environment of the vehicle.

The radar computing component 106 comprises a signal generator component 108 that prepares radar signals for transmission by way of the transmit antenna 102 and a radar analysis component 110 that analyzes the radar data received by the receive antenna 104. The radar sensor 100 is configured to repeatedly, or continuously, transmit radar signals (e.g., pulse sequences) by way of the transmit antenna 102, and to receive radar returns repeatedly, or continuously, by way of the receive antenna 104.

In exemplary implementations, the radar returns received by the receive antenna 104 comprise reflections, from objects in the operational environment of the radar sensor 100, of radar signals emitted by the transmit antenna 102. Responsive to receipt of radar returns from the operational environment of the radar sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The radar sensor 100 further includes a signal processing component 112. The signal processing component 112 receives a radar signal from the receive antenna 104. The signal processing component 112, for instance, can capture a plurality of radar returns from a plurality of objects in an operating environment. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform a variety of these signal processing operations (e.g., mixing) based further upon a radar signal transmitted by the transmit antenna 102.

The radar computing component 106 receives the radar data via the signal processing component 112. The radar analysis component 110 of the radar computing component 106 is configured to determine properties of the each of the objects in the operational environment of the radar sensor 100 based upon the radar data. In a non-limiting example, the radar analysis component 110 can compute a range, a bearing, and/or a velocity of an object in the operational environment of the radar sensor 100 based upon the radar data. The radar sensor 100 also includes a sensor output 114 indicative of the analyzed radar data.

Figure 2:
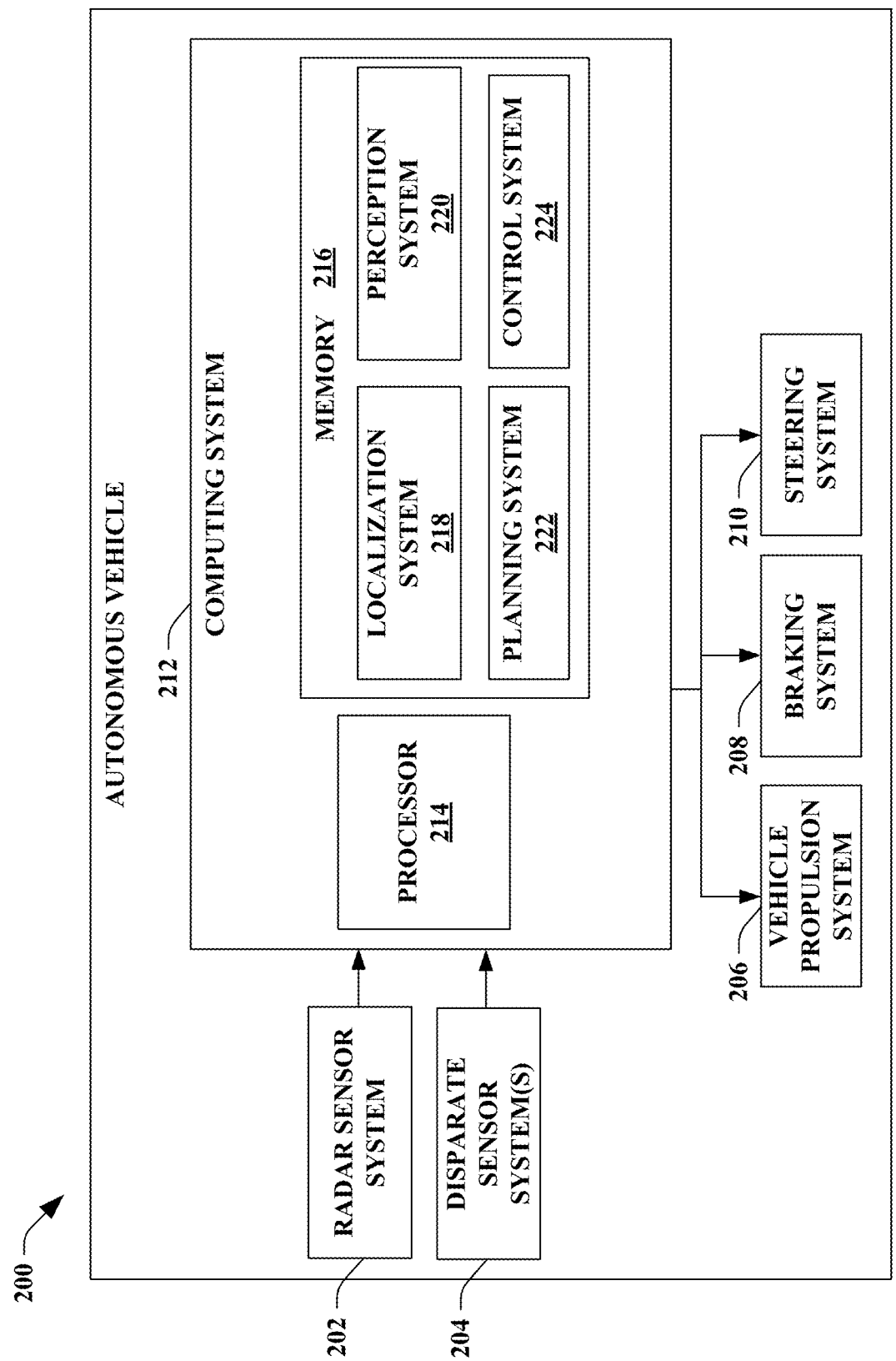
FIG. 2 is a functional block diagram of an exemplary autonomous vehicle.

Various technologies described herein are suitable for use in connection with an autonomous vehicle (AV) that employs a radar system to facilitate navigation about roadways. Referring to FIG. 2, an exemplary AV 200 is illustrated, wherein the AV 200 can navigate about roadways without human conduction based upon sensor signals output by sensor systems of the AV 200. The AV 200 includes a plurality of sensor systems 202-204. The sensor systems 202-204 may be of different types. The sensor systems 202-204 include a radar sensor system 202 and disparate sensor system(s) 204 (e.g., substantially any number and types of sensor systems in addition to the radar sensor system 202). The radar sensor system 202 can be or include the radar sensor 100 (or a plurality of radar sensors each similar to the radar sensor 100). The disparate sensor system(s) 204, for example, can include a lidar sensor system, a camera (image) system, and/or a sonar system. Other exemplary sensor systems that can additionally or alternatively be included in the disparate sensor system(s) 204 include GPS sensor systems, inertial sensor systems, infrared sensor systems, and the like. The various sensor systems 202-204 are arranged about the AV 200. The sensor systems 202-204 are configured to repeatedly (e.g., continuously, or periodically) output sensor data that is representative of objects and conditions in the driving environment of the AV 200.

The AV 200 further includes several mechanical systems that are used to effectuate appropriate motion of the AV 200. For instance, the mechanical systems can include but are not limited to, a vehicle propulsion system 206, a braking system 208, and a steering system 210. The vehicle propulsion system 206 may be an electric engine, a combustion engine, or a combination thereof. The braking system 208 can include an engine brake, brake pads, actuators, a regenerative braking system, and/or any other suitable componentry that is configured to assist in decelerating the AV 200. The steering system 210 includes suitable componentry that is configured to control the direction of movement of the AV 200.

The AV 200 additionally comprises a computing system 212 that is in communication with the sensor systems 202-204 and is further in communication with the vehicle propulsion system 206, the braking system 208, and the steering system 210. The computing system 212 includes a processor 214 and memory 216 that includes computer-executable instructions that are executed by the processor 214. In an example, the processor 214 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 216 comprises a localization system 218, a perception system 220, a planning system 222, and a control system 224. Briefly, the localization system 218 is configured to determine a local position of the AV 200. The perception system 220 is configured to identify the presence of objects and/or characteristics of objects in the driving environment of the AV 200 based upon sensor data output by the sensor systems 202-204. The planning system 222 is configured to plan a route and/or a maneuver of the AV 200 based upon data pertaining to objects in the driving environment that are output by the perception system 220. The control system 224 is configured to control the mechanical systems 206-210 of the AV 200 to effectuate appropriate motion to cause the AV 200 to execute a maneuver planned by the planning system 222.

The perception system 220 is configured to identify objects in proximity to the AV 200 that are captured in sensor signals output by the sensor systems 202-204. By way of example, the perception system 220 can be configured to identify the presence of an object in the driving environment of the AV 200 based upon images generated by a camera system included in the disparate sensor system(s) 204. In another example, the perception system 220 can be configured to determine a presence and position of an object based upon radar data output by the radar sensor system 202. In exemplary implementations, the radar sensor system 202 can include one or more radar sensors 100. In such implementations, the perception system 220 can be configured to identify a position of an object in the driving environment of the AV 200 based upon the estimated range output by the radar sensor 100.

The AV 200 can be included in a fleet of AVs that are in communication with a common server computing system. In these implementations, the server computing system can control the fleet of AVs such that radar sensor systems of AVs operating in a same driving environment (e.g., within line of sight of one another, or within a threshold distance of one another) employ different pulse sequence carrier frequencies. In an exemplary implementation, a radar sensor system of a first AV can be controlled so as not to transmit pulse sequences having same center frequencies as pulse sequences transmitted by a radar sensor system of a second AV at the same time. In further implementations, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B, A, D, C. Such configurations can mitigate the effects of interference when multiple AVs that employ radar sensor systems are operating in a same driving environment.

Reference is again made to FIG. 1. The radar sensor 100 is calibrated with the use of a radar map of the environment that the radar sensor 100 is operating in (i.e., the operating environment). To that end, in an exemplary implementation, the radar sensor 100 can include a radar map module 116. The radar map module 116 is configured to access a predetermined radar map of radar data for known static objects in the operating environment. Examples of known static objects that can be represented in the predetermined radar map can include signs, buildings, bridges, or substantially any other static object that remains fixed in the environment. According to an example, the radar sensor 100 can include the predetermined radar map, which can be accessed by the radar map module 116. Pursuant to another example, the computing system 212 of the autonomous vehicle 200 can store the predetermined radar map (e.g., the radar map can be stored in a data store of the computing system 212); following this example, the radar map module 116 can access the predetermined radar map retained by the computing system 212 of the autonomous vehicle 200. In some implementations, the predetermined radar map may only include a select group of known static objects in the operating environment for use in calibrating the radar sensor 100.

The radar map includes expected radar reflectance values for a plurality of known static objects in the operating environment as a function of range and angle of the radar sensor 100. For example, the localized position and orientation of the radar sensor within the map is defined by coordinates X1, Y1, Z1 with three rotation angles (RX, RY, RZ (i.e., yaw, pitch, and roll). For a static object at map coordinates X2, Y2, the radar map will contain an expected reflectance value that a radar sensor at coordinates X1, Y1, Z1, and orientation RX, RY, RZ should receive from the given static object. In this way, the radar map provides information regarding how the reflectance value is impacted by the range from the object and by the orientation of the radar sensor.

The radar map may be created, for example, by gathering radar data from radar systems of AVs as those AVs drive around the operating environment (e.g., town, city, etc.). While driving around the operating environment, the radar system of each of the AVs records the position and orientation of the radar sensors of the radar systems of the AVs and records the magnitude of the radar return and location of the object generating the return.

The radar sensor 100 further includes a radar sensor position module 118 configured to identify a location and orientation of the radar sensor 100. The radar sensor position module 118 may utilize any suitable sensing devices for determining the position and the orientation of the radar sensor 100 at a given time, such as GPS sensor systems and inertial sensor systems, which may already be associated with the radar sensor system 202 or the AV 200. Additionally or alternatively, the radar sensor position module 118 can receive information specifying the local position of the AV 200 from the localization system 218 of the AV 200; the radar sensor position module 118 can further determine the position and orientation of the radar sensor 100 based at least in part on the information specifying the local position of the AV 200. Since range and orientation of the radar sensor 100 impact the magnitude of the radar return, the range and orientation information provided by the radar sensor position module 118 is used to calibrate the radar sensor 100 as described below.

The radar sensor 100 further includes a comparison module 120 configured to identify expected reflectance values for each of the known static objects based on the identified location and orientation of the radar sensor 100. The comparison module 120 is configured to communicate with the radar map module 116 and the radar sensor position module 118 for this purpose. In particular, the comparison module 120 identifies the location of an object from the radar returns. The comparison module 120 then communicates with the radar sensor position module 118 to identify the position and orientation of the radar sensor 100 associated with the radar return (i.e., the position and orientation of the radar sensor 100 when that radar signal, associated with the radar return, was sent from the radar sensor). The comparison module 120 then communicates with the radar map module 116 to identify the expected reflectance value for the object based on the position and the orientation identified from the radar sensor position module 118.

The radar sensor 100 further includes a correction module 122. The correction module 122 is configured to calculate a conversion function to adjust the magnitudes associated with each of the radar returns of the known static objects to estimated reflectance values based on the expected reflectance values for each of the known static objects. For example, the correction module 122 takes the actual radar return magnitudes for the known static objects and the expected reflectance value for each of the known static objects, as determined by the comparison module 120, and determines a conversion function (e.g., curve fitting) to adjust the actual radar return magnitudes to values that approximate the expected values. In an exemplary implementation, the conversion function is in the form of a polynomial equation, which can be any order polynomial equation suitable for use as a conversion function.

The correction module 122 is also configured to adjust the output of the radar sensor 100 based on the conversion function. For example, the sensor output 114 may represent a magnitude of the radar signal. The correction module 122 may use the conversion function to adjust the magnitude of the sensor output 114. This adjusted sensor output is then used by the computing system 212 of the AV 200 during operation. Thus, radar returns from non-static objects or objects other than those represented in the radar map can be adjusted by the correction module 122 using the conversion function. Accordingly, the correction module 122 can adjust the magnitudes associated with each of the radar returns from the plurality of objects (i.e., the known static object(s) as well as other object(s) such as non-static object(s) or objects other than those represented in the radar map) based on the conversion function.

In various embodiments, it is contemplated that the memory 216 of the computing system 212 of the autonomous vehicle 200 can additionally or alternatively include one or more of the radar map module 116, the radar sensor position module 118, the comparison module 120, and/or the correction module 112.

Figure 3:
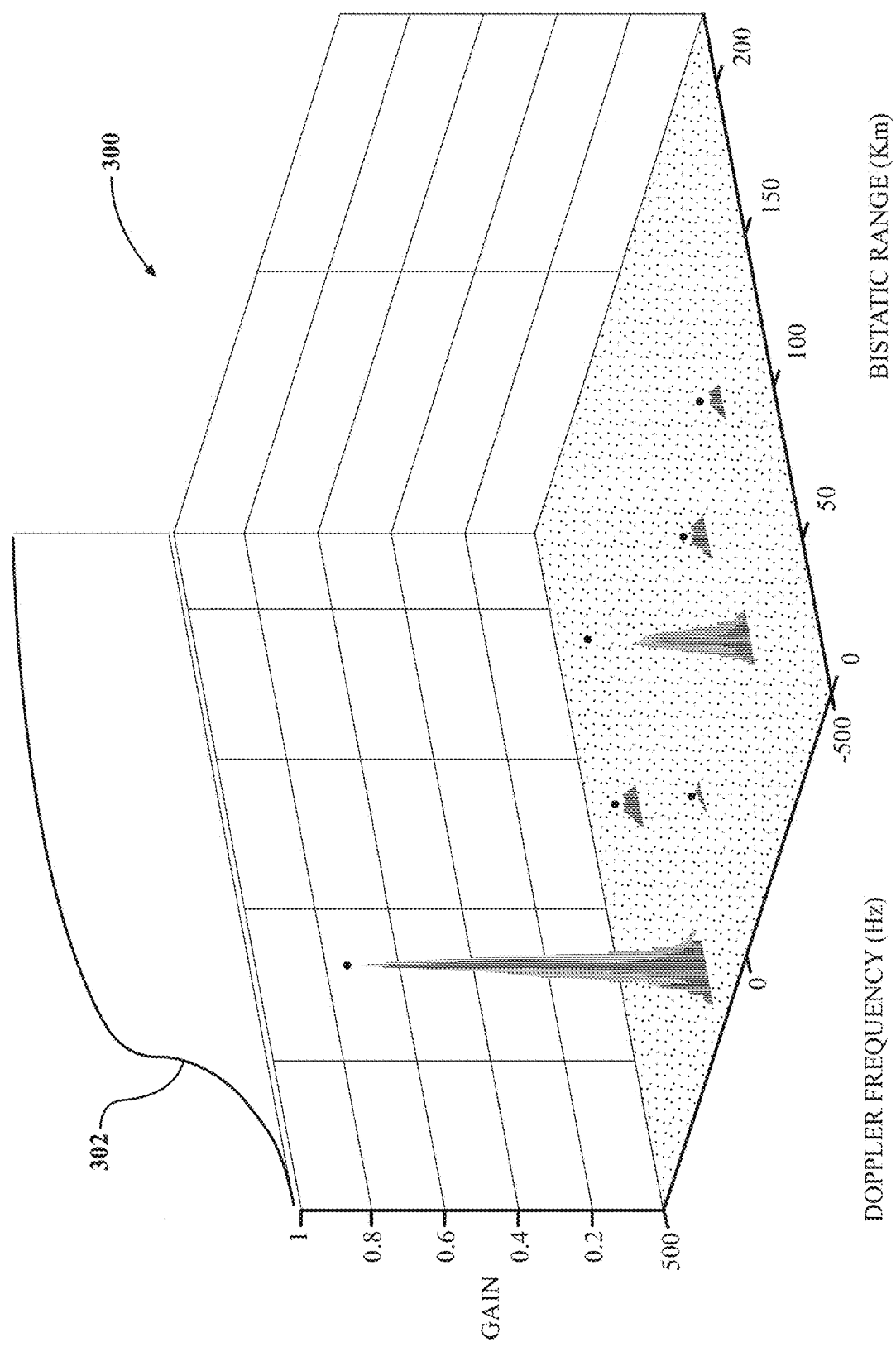
FIG. 3 is a graphical illustration of exemplary radar data and an example conversion function that can be applied to the radar data.

Referring to FIG. 3, depicted is a graphical illustration 300 of exemplary radar data and an example conversion function 302 that can be applied to the radar data. As noted above, the magnitudes (e.g., gains) associated with the actual radar returns for the known static objects can be obtained. For instance, FIG. 3 illustrates a magnitude map of the actual radar returns. Further, utilizing the approaches described herein, the conversion function 302 can be determined from the magnitude map of the actual radar returns.

Figure 4:
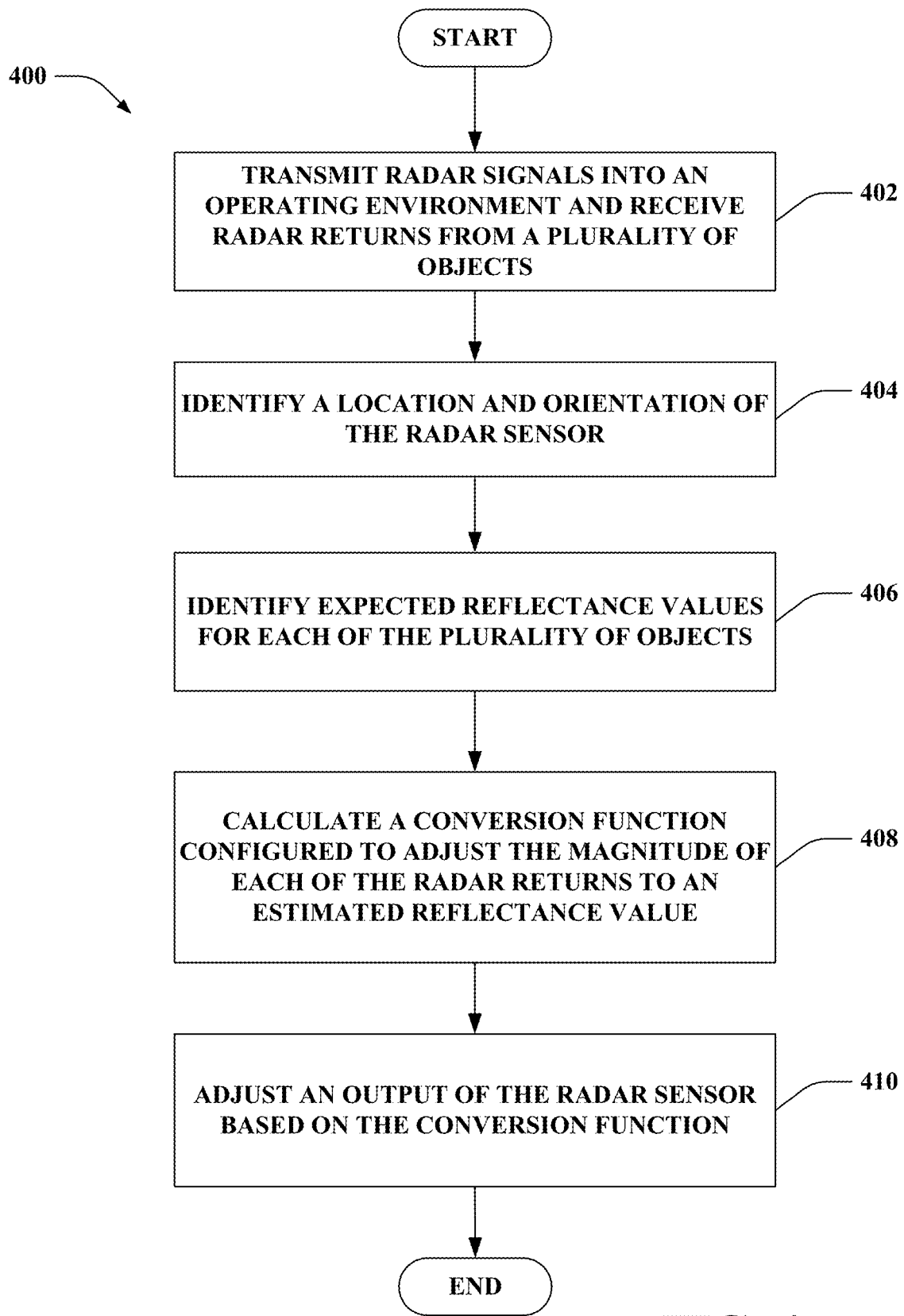
FIG. 4 is a flow diagram that illustrates an exemplary methodology for calibrating a radar sensor.

FIG. 4 illustrates an exemplary methodology relating to calibrating a radar sensor. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 4 illustrates a flow chart of an exemplary method 400 for calibrating the radar sensor 100. In particular, at step 402 during operation of the radar sensor system 202, the radar sensor 100 transmits radar signals from the transmit antenna 102 into the operating environment and receives radar returns at the receive antenna 104 from a plurality of objects in the operating environment. At least a subset of the objects are known static objects. The radar returns are processed within the radar sensor 100 by the signal processing component 112 and analyzed by the radar analysis component 110 as described above. At step 404, the radar sensor position module 118 identifies the position and the orientation of the radar sensor 100 at the time the radar signal was transmitted.

At step 406, the comparison module 120 identifies the expected reflectance values for each of the selected known static objects in the radar returns. To do so, the comparison module 120 uses the location of the known static objects from the radar returns, as determined by the radar analysis component 110 of the radar sensor 100, the position and orientation of the radar sensor 100 associated with the radar return as determined by the radar sensor position module 118, and the expected reflectance value for the known static objects from the radar map module 116 based on the position and the orientation of the radar sensor 100.

At step 408, the correction module 122 compares the actual magnitude of each the plurality of selected known static objects from the radar return with the expected reflectance value for each of those known static objects as identified by the comparison module 120. The correction module 122 then uses this set of data to determine a conversion function (e.g., a polynomial equation) that fits the dataset. At step 410, the correction module 122 then uses the conversion function to adjust the output of the radar sensor 100 (i.e., calibrate the sensor) so that the output is an estimated reflectance value that more closely resembles the expected reflectance values. The radar sensor output can be repeatedly or continuously adjusted in this manner during operation of the radar sensor 100. Furthermore, a faulty radar sensor can be easily and timely identified based on the difference between the magnitude of the radar return and the expected reflectance value. A large difference can be flagged by the radar system 202 as being indicative of a faulty radar sensor.

Figure 5:
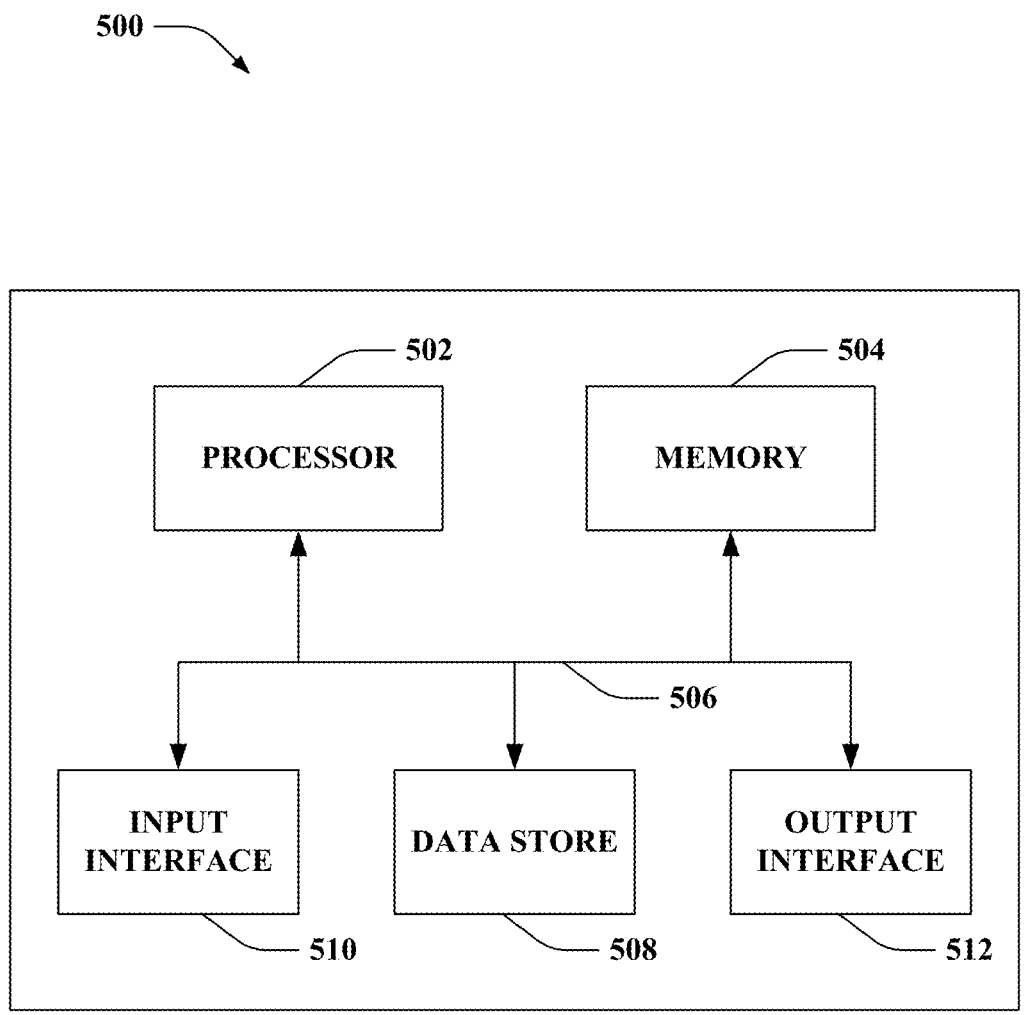
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be or include the computing system 212. The computing device 500 includes at least one processor 502 that executes instructions that are stored in a memory 504. The instructions may be, for instance, instructions for implementing functionality described as being carried out by one or more modules, components, or systems discussed above or instructions for implementing one or more of the methods described above. The processor 502 may be a GPU, a plurality of GPUs, a CPU, a plurality of CPUs, a multi-core processor, etc. The processor 502 may access the memory 504 by way of a system bus 506. In addition to storing executable instructions, the memory 504 may also store radar data, beam-formed radar data, neural network configurations, etc.

The computing device 500 additionally includes a data store 508 that is accessible by the processor 502 by way of the system bus 506. The data store 508 may include executable instructions, radar data, beamformed radar data, embeddings of these data in latent spaces, etc. The computing device 500 also includes an input interface 510 that allows external devices to communicate with the computing device 500. For instance, the input interface 510 may be used to receive instructions from an external computing device, etc. The computing device 500 also includes an output interface 512 that interfaces the computing device 500 with one or more external devices. For example, the computing device 500 may transmit control signals to the vehicle propulsion system 206, the braking system 208, and/or the steering system 210 by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Systems and methods have been described herein in accordance with at least the examples set forth below.

(A1) In one aspect, a method of calibrating a radar sensor is disclosed herein, where the method includes transmitting a radar signal into an operating environment. The method also includes receiving radar returns from a plurality of objects in the operating environment based on the radar signal sent, each of the radar returns having a magnitude associated with each of the plurality of objects, and at least a subset of the objects are known static objects. The method additionally includes identifying a location and orientation of the radar sensor when the radar signal was sent. The method further includes identifying an expected reflectance value for each of the plurality of known static objects. The method also includes calculating a conversion function configured to adjust the magnitude associated with each of the radar returns from the known static objects to an estimated reflectance value based on the expected reflectance value for each of the plurality of known static objects. The method further includes adjusting an output of the radar sensor based on the conversion function.

(A2) In some embodiments of the method of (A1), identifying expected reflectance values for each of the plurality of known static objects further comprises accessing a predetermined radar map of the operating environment of the radar sensor comprising the plurality of known static objects, wherein the predetermined radar map identifies expected reflectance values for each of the plurality of known static objects.

(A3) In some embodiments of the method of (A2), each of the plurality of known static objects is a static object in the operating environment.

(A4) In some embodiments of at least one of the methods of (A2)-(A3), the expected reflectance values are a function of the location and orientation of the radar sensor.

(A5) In some embodiments of at least one of the method of (A2)-(A4), the predetermined radar map identifies the expected reflectance values for a set of known static objects in the operating environment.

(A6) In some embodiments of at least one of the methods of (A1)-(A5), the conversion function is a polynomial equation.

(A7) In some embodiments of at least one of the methods of (A1)-(A6), the conversion function is continuously updated during operation of the radar sensor based on receiving additional radar returns.

(A8) In some embodiments of at least one of the methods of (A1)-(A7), the output of the radar sensor is continuously adjusted based on the conversion function during operation of the radar sensor.

(A9) In some embodiments of at least one of the methods of (A1)-(A8), adjusting the output of the radar sensor based on the conversion function further comprises adjusting the magnitudes associated with each of the radar returns from the plurality of objects based on the conversion function.

(B1) In another aspect, a radar sensor located in an operating environment is disclosed herein, where the radar sensor includes a signal processing component configured to capture a plurality of radar returns from a plurality of objects in the operating environment, wherein the plurality of radar returns from the plurality of objects are captured based on a radar signal sent from the radar sensor, and at least a subset of the objects are known static objects. The radar sensor further includes a radar map module configured to access a predetermined radar map of radar data for the plurality of known static objects in the operating environment. The radar sensor also includes a radar sensor position module configured to identify a location and orientation of the radar sensor when the radar signal was sent. Additionally, the radar sensor includes a comparison module configured to identify expected reflectance values for each of the plurality of known static objects based on the location and orientation of the radar sensor. Moreover, the radar sensor includes a correction module configured to calculate a conversion function to adjust a magnitude of each of the radar returns for the known static objects to an estimated reflectance value based on the expected reflectance values for each of the plurality of known static objects, the correction module further configured to adjust an output of the radar sensor based on the conversion function.

(B2) In some embodiments of the radar sensor of (B1), each of the plurality of known static objects is a static object in the operating environment.

(B3) In some embodiments of at least one of the radar sensors of (B1)-(B2), the conversion function is a polynomial equation.

(B4) In some embodiments of at least one of the radar sensors of (B1)-(B3), the correction module continuously updates the conversion function during operation of the radar sensor based on the radar returns.

(B5) In some embodiments of at least one of the radar sensors of (B1)-(B4), the correction module continuously adjusts the output of the radar sensor based on the conversion function during operation of the radar sensor.

(B6) In some embodiments of at least one of the radar sensors of (B1)-(B5), adjusting the output of the radar sensor based on the conversion function further comprises adjusting the magnitudes associated with each of the radar returns from the plurality of objects based on the conversion function.

(C1) In another aspect, an autonomous vehicle for traversing an operating environment is disclosed herein, where the autonomous vehicle includes a radar sensor. The operating environment includes a plurality of objects that are detectable by the radar sensor, wherein the radar sensor captures a plurality of radar returns from the plurality of objects based on a radar signal sent from the radar sensor, and at least a subset of the objects are known static objects. The autonomous vehicle also includes a computing system in communication with the radar sensor, where the computing system includes a radar map module configured to access a predetermined radar map of radar data for the plurality of known static objects in the operating environment. The computing system also includes a radar sensor position module configured to identify a location and orientation of the radar sensor when the radar signal was sent. The computing system further includes a comparison module configured to identify expected reflectance values for each of the plurality of known static objects based on the location and orientation of the radar sensor. Moreover, the computing system includes a correction module configured to calculate a conversion function to adjust a magnitude of each of the radar returns for the known static objects to an estimated reflectance value based on the expected reflectance values for each of the plurality of known static objects, the correction module further configured to adjust an output of the radar sensor based on the conversion function.

(C2) In some embodiments of the autonomous vehicle of (C1), each of the plurality of known static objects is a static object in the operating environment.

(C3) In some embodiments of at least one of the autonomous vehicles of (C1)-(C2), the conversion function is a polynomial equation.

(C4) In some embodiments of at least one of the autonomous vehicles of (C1)-(C3), the correction module continuously updates the conversion function during operation of the radar sensor based on the radar returns.

(C5) In some embodiments of at least one of the autonomous vehicles of (C1)-(C4), the correction module continuously adjusts the output of the radar sensor based on the conversion function during operation of the radar sensor.

What has been described above includes examples of one or more implementations. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of calibrating a radar sensor, comprising:
    transmitting a radar signal into an operating environment;
    receiving radar returns from a plurality of objects in the operating environment based on the radar signal sent, each of the radar returns having a magnitude associated with each of the plurality of objects, and at least a subset of the objects are known static objects;
    identifying a location and orientation of the radar sensor when the radar signal was sent;
    obtaining a predetermined radar map of the operating environment, the predetermined radar map comprising expected reflectance values for each of the known static objects as a function of the location and the orientation of the radar sensor when the radar signal was sent;
    identifying the expected reflectance value from the predetermined radar map for each of the known static objects based on the location and the orientation of the radar sensor when the radar signal was sent;
    calculating a conversion function configured to adjust the magnitude associated with each of the radar returns from the known static objects to an estimated reflectance value based on the expected reflectance value for each of the known static objects; and
    adjusting the magnitude associated with each of the radar returns from the plurality of objects based on the conversion function.

2. The method according to claim 1, wherein each of the known static objects is a static object in the operating environment.

3. The method according to claim 1, wherein the predetermined radar map identifies the expected reflectance values for a set of known static objects in the operating environment.

4. The method according to claim 1, wherein the conversion function is a polynomial equation.

5. The method according to claim 1, wherein the conversion function is continuously updated during operation of the radar sensor based on receiving additional radar returns.

6. The method according to claim 1, wherein an output of the radar sensor is continuously adjusted based on the conversion function during operation of the radar sensor.

7. The method according to claim 1, further comprising adjusting an output of the radar sensor based on the conversion function, wherein adjusting the output further comprises adjusting the magnitude associated with each of the radar returns from the plurality of objects based on the conversion function.

8. The method of claim 1, wherein the known static objects comprise at least one of a stop sign, a bridge, or a building.

9. A radar sensor located in an operating environment, the radar sensor comprising:
   a processor;
   a signal processing component comprising instructions that, when executed by the processor, cause the processor to capture a plurality of radar returns from a plurality of objects in the operating environment, wherein each of the radar returns has a magnitude associated with each of the plurality of objects, and at least a subset of the objects are known static objects;
   a radar map module comprising instructions, that when executed by the processor, cause the processor to access a predetermined radar map of the operating environment, the predetermined radar map comprising expected reflectance values for each of the known static objects as a function of a location and an orientation of the radar sensor when a radar signal was sent;
   a radar sensor position module comprising instructions, that when executed by the processor, cause the processor to identify a location and orientation of the radar sensor when the radar signal was sent;
   a comparison module comprising instructions, that when executed by the processor, cause the processor to identify the expected reflectance values from the predetermined radar map for each of the known static objects based on the location and the orientation of the radar sensor when the radar signal was sent; and
   a correction module comprising instructions, that when executed by the processor, cause the processor to calculate a conversion function to adjust the magnitude associated with each of the radar returns from the plurality of objects, the correction module further configured to adjust an output of the radar sensor based on the conversion function.

10. The radar sensor according to claim 9, wherein each of the known static objects is a static object in the operating environment.

11. The radar sensor according to claim 9, wherein the conversion function is a polynomial equation.

12. The radar sensor according to claim 9, wherein the correction module continuously updates the conversion function during operation of the radar sensor based on the radar returns.

13. The radar sensor according to claim 9, wherein the correction module continuously adjusts the output of the radar sensor based on the conversion function during operation of the radar sensor.

14. The radar sensor of claim 9, wherein the known static objects comprise at least one of a stop sign, a bridge, or a building.

15. The radar sensor according to claim 9, wherein adjusting the output of the radar sensor based on the conversion function further comprises adjusting the magnitude associated with each of the radar returns from the plurality of objects based on the conversion function.

16. An autonomous vehicle for traversing an operating environment, the autonomous vehicle comprising:
   a radar sensor, wherein the operating environment includes a plurality of objects that are detectable by the radar sensor, wherein the radar sensor captures a plurality of radar returns from the plurality of objects based on a radar signal sent from the radar sensor, wherein each of the radar returns has a magnitude associated with each of the plurality of objects, and at least a subset of the objects are known static objects; and
   a computing system in communication with the radar sensor, wherein the computing system comprises:
      a radar map module comprising instructions, that when executed by the computing system, cause the computing system to access a predetermined radar map of the operating environment, the predetermined radar map comprising expected reflectance values for each of the known static objects as a function of a location and an orientation of the radar sensor when the radar signal was sent;
      a radar sensor position module comprising instructions, that when executed by the computing system, cause the computing system to identify a location and orientation of the radar sensor when the radar signal was sent;
      a comparison module comprising instructions, that when executed by the computing system, cause the computing system to identify the expected reflectance values from the predetermined radar map for each of the known static objects based on the location and the orientation of the radar sensor when the radar signal was sent; and
      a correction module comprising instructions, that when executed by the computing system, cause the computing system to calculate a conversion function to adjust the magnitude associated with each of the radar returns from known static objects, the correction module further configured to adjust an output of the radar sensor based on the conversion function.

17. The autonomous vehicle according to claim 16, wherein each of the known static objects is a static object in the operating environment.

18. The autonomous vehicle according to claim 16, wherein the conversion function is a polynomial equation.

19. The autonomous vehicle according to claim 16, wherein the correction module continuously updates the conversion function during operation of the radar sensor based on the radar returns.

20. The autonomous vehicle according to claim 16, wherein the correction module continuously adjusts the output of the radar sensor based on the conversion function during operation of the radar sensor.

* * * * *